United States Patent
Khalid et al.

(10) Patent No.: US 10,189,412 B2
(45) Date of Patent: Jan. 29, 2019

(54) STOW-AWAY TAILGATE

(71) Applicant: FORD GLOBAL TECHNOLOGIES, LLC, Dearborn, MI (US)

(72) Inventors: Umer Khalid, Farmington Hills, MI (US); Brian Christopher Stark, LaSalle (CA); Mohamed Mattar, Dearborn, MI (US); Mohannad Hakeem, Dearborn, MI (US)

(73) Assignee: Ford Global Technologies LLC, Dearborn, MI (US)

( * ) Notice: Subject to any disclaimer, the term of this patent is extended or adjusted under 35 U.S.C. 154(b) by 46 days.

(21) Appl. No.: 15/484,604

(22) Filed: Apr. 11, 2017

(65) Prior Publication Data

US 2018/0290598 A1    Oct. 11, 2018

(51) Int. Cl.
| | |
|---|---|
| *B62D 25/10* | (2006.01) |
| *B60R 5/04* | (2006.01) |
| *B62D 33/027* | (2006.01) |
| *E06B 3/36* | (2006.01) |
| *E06B 3/38* | (2006.01) |
| *B62D 33/03* | (2006.01) |

(52) U.S. Cl.
CPC ............ *B60R 5/04* (2013.01); *B62D 33/0273* (2013.01); *E06B 3/36* (2013.01); *E06B 3/38* (2013.01); *B62D 33/03* (2013.01)

(58) Field of Classification Search
CPC ...... B60R 5/04; B62D 33/0273; B62D 33/03; E06B 3/36; E06B 3/38
See application file for complete search history.

(56) References Cited

U.S. PATENT DOCUMENTS

| | | | |
|---|---|---|---|
| 3,387,406 A | 6/1968 | Coker et al. | |
| 4,580,828 A | 4/1986 | Jones | |
| 5,468,037 A * | 11/1995 | Peterson | ............ B62D 33/0273 296/180.1 |
| 6,302,465 B1 * | 10/2001 | Faber | ...................... B60P 1/003 296/39.1 |
| 6,390,527 B1 | 5/2002 | Leftridge | |
| 6,464,278 B2 | 10/2002 | Bailey | |
| 6,886,877 B1 | 5/2005 | Plavetich et al. | |
| 7,080,868 B2 * | 7/2006 | McClure | ................ B62D 25/04 296/146.11 |
| 7,128,357 B1 | 10/2006 | Carroll | |
| 7,290,820 B1 * | 11/2007 | Smith | ..................... B60R 11/00 296/37.6 |
| 7,422,262 B2 | 9/2008 | Marshall | |
| 7,481,479 B1 * | 1/2009 | Townson | ........... B62D 33/0273 16/223 |
| 8,136,862 B2 * | 3/2012 | Bator | ................. B62D 33/0273 296/57.1 |

(Continued)

*Primary Examiner* — Lori L Lyjak
(74) *Attorney, Agent, or Firm* — Jason Rogers; King & Schickli PLLC

(57) ABSTRACT

A closure assembly for a vehicle includes a closure hingedly connected to a vehicle-rearmost portion of a cargo area and adapted to pivot into a receiver provided in a portion of the cargo area. The receiver may be provided in a portion of a cargo area load floor or in a portion of a cargo area sidewall. The closure may include a bottom hinge and/or a side hinge, adapted to pivot the closure both vehicle-rearwardly and vehicle-forwardly. A cover may be provided to hide the closure in the stowed configuration.

18 Claims, 6 Drawing Sheets

(56) References Cited

U.S. PATENT DOCUMENTS

| | | | |
|---|---|---|---|
| 8,342,590 B1 | 1/2013 | Richburg | |
| 8,740,279 B1* | 6/2014 | McGoff | E05B 83/20 296/51 |
| 2009/0102216 A1* | 4/2009 | Hanzel | B60P 1/26 296/26.11 |
| 2009/0102219 A1* | 4/2009 | Schrader | B62D 25/10 296/37.5 |
| 2009/0183433 A1* | 7/2009 | Cheung | B62D 33/0273 49/169 |
| 2009/0250961 A1* | 10/2009 | Townson | B62D 33/0273 296/57.1 |

\* cited by examiner

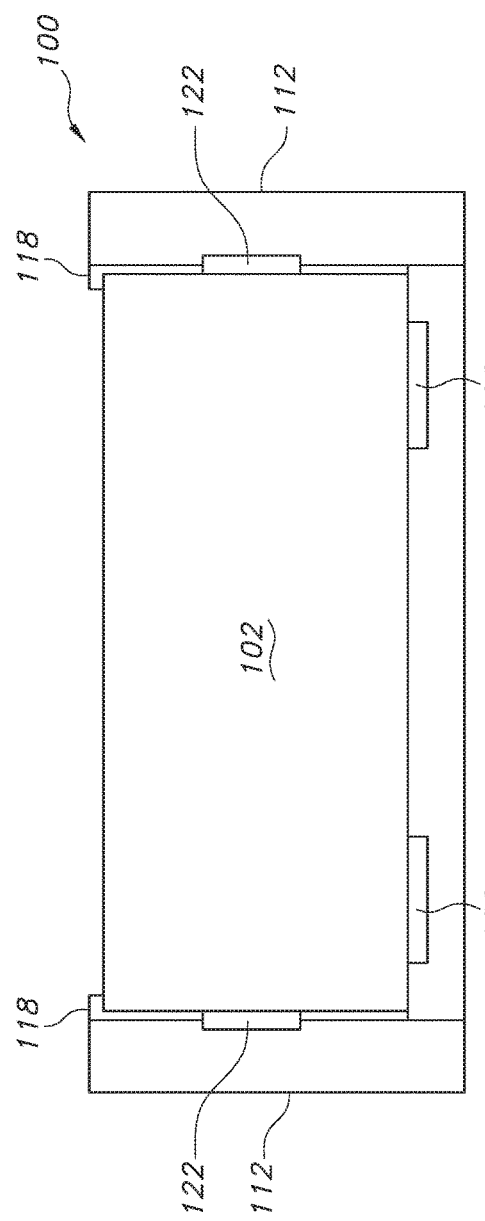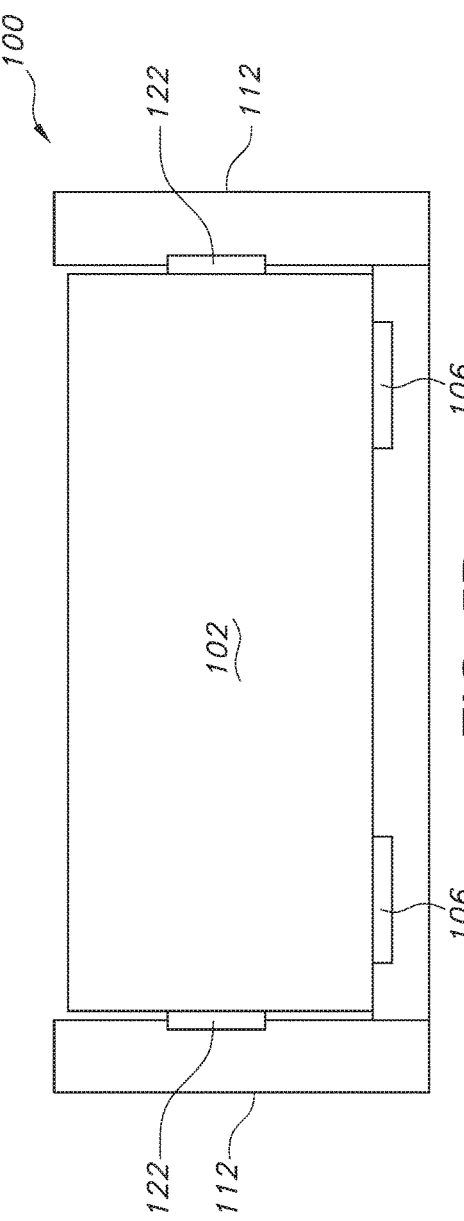

STOW-AWAY TAILGATE

TECHNICAL FIELD

This document relates generally to the motor vehicle field and, more particularly, to a vehicle tailgate or other cargo area closure which can be stowed in a portion of a vehicle cargo area.

BACKGROUND

For various reasons, it may be desirable to remove a vehicle cargo area closure. For example, a conventional tailgate may be unable to safely bear the weight of a very heavy load being loaded onto or unloaded from a vehicle cargo area. In such situations, safety dictates removing the tailgate prior to loading/unloading. As other examples, users of vehicles such as pickup trucks may wish to transport items which exceed the usable length of a vehicle cargo area, and to do so must remove the tailgate. Likewise, it is known that a pickup truck tailgate in the upright position creates drag, reducing fuel economy. Removing the tailgate may improve vehicle aerodynamics and attendant fuel economy.

However, storage of a sizeable cargo area closure such as a tailgate is problematic. The user could remove the tailgate and leave it at the journey starting point. However, simply removing the tailgate and placing it aside risks damage to the tailgate. Further, on reaching her destination the user would not have the use of the tailgate. The tailgate could be placed in the vehicle cargo area or passenger cabin, but then available space for other items is reduced. In turn, simply placing the tailgate in the pickup truck bed also risks damage to the tailgate and/or to other vehicles should the tailgate inadvertently dislodge from the bed.

Accordingly, a need is identified for a vehicle cargo area closure such as a tailgate or other closure that can be easily stowed for safety and added cargo area flexibility. The cargo area closure should be stowable in a configuration that does not to occupy otherwise usable cargo area storage space, but which can be rapidly and easily deployed from the stowed configuration for use.

SUMMARY

In accordance with the purposes and benefits described herein and to satisfy the above-identified need in the art, in one aspect of this disclosure a closure assembly for a vehicle is provided, comprising a closure hingedly connected to a vehicle-rearmost portion of a cargo area and adapted to pivot into a receiver provided in a portion of the cargo area. In embodiments, the receiver may be provided in a cargo area load floor and/or a cargo area sidewall.

In embodiments, the stowable closure may includes a bottom hinge adapted to pivot the closure both vehicle-rearwardly and vehicle-forwardly. The bottom hinge may be mounted to a closure bottom edge which abuts a portion of the cargo area load floor. In embodiments, the closure may include a side hinge adapted to pivot the closure both vehicle-rearwardly and vehicle-forwardly. The side hinge may be mounted to a closure side edge which abuts a portion of the cargo area sidewall.

In another aspect, a cargo area assembly for a vehicle is provided comprising at least a load floor and a pair of opposed sidewalls. A receiver is provided in at least one of the load floor and/or a one of the pair of opposed sidewalls. A closure is hingedly connected to a vehicle-rearmost portion of the cargo area and adapted to pivot into a stowed position within the closure receiver.

The closure may in embodiments be a tailgate including a bottom hinge adapted to pivot the tailgate both vehicle-rearwardly and vehicle-forwardly. The bottom hinge may be mounted to a tailgate bottom edge abutting a portion of the load floor. In other embodiments the tailgate may include a side hinge adapted to pivot the tailgate both vehicle-rearwardly and vehicle-forwardly. The side hinge may be mounted to a tailgate side edge which abuts a portion of the one of the pair of opposed sidewalls.

In embodiments, the closure receiver is a compartment provided in the load floor and including a compartment cover. In other embodiments, the closure receiver is a compartment provided in a one of the pair of opposed sidewalls and including a compartment cover.

In yet another aspect, a vehicle is provided, comprising a body including a cargo area comprising at least a load floor, a pair of opposed sidewalls, and a cargo area closure. A cargo area closure receiver is provided in at least one of the load floor or a one of the pair of opposed sidewalls. The closure receiver may be a compartment provided in the load floor and/or in the one of the pair of opposed sidewalls.

In the following description, there are shown and described several preferred embodiments of a stowable cargo area closure. As it should be realized, the device is capable of other, different embodiments and its several details are capable of modification in various, obvious aspects all without departing from the stowable cargo area closure and associated assemblies as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the stowable cargo area closure and together with the description serve to explain certain principles thereof. In the drawing figures:

FIG. 5C shows an alternative embodiment of a vehicle sidewall arrangement allowing vehicle-forward pivoting of a cargo area closure; and FIG. 5D shows operation of the vehicle sidewall arrangement of FIG. 5C.

Reference will now be made in detail to the present preferred embodiments of the vehicle stowable cargo area closure, examples of which are illustrated in the accompanying drawing figures.

DETAILED DESCRIPTION

Preliminarily, the description that follows is directed primarily to a vehicle cargo area and stowable closure of a particular type, being a pickup truck bed and associated tailgate. However, the skilled artisan will readily appreciate that the described structures are equally applicable to other vehicle and closure types, for example closures for vehicles having enclosed cargo areas such as sport-utility vehicles, cross-over utility vehicles, vans, and the like. Therefore, the descriptions should not be taken as limiting in this regard.

Figure 1:
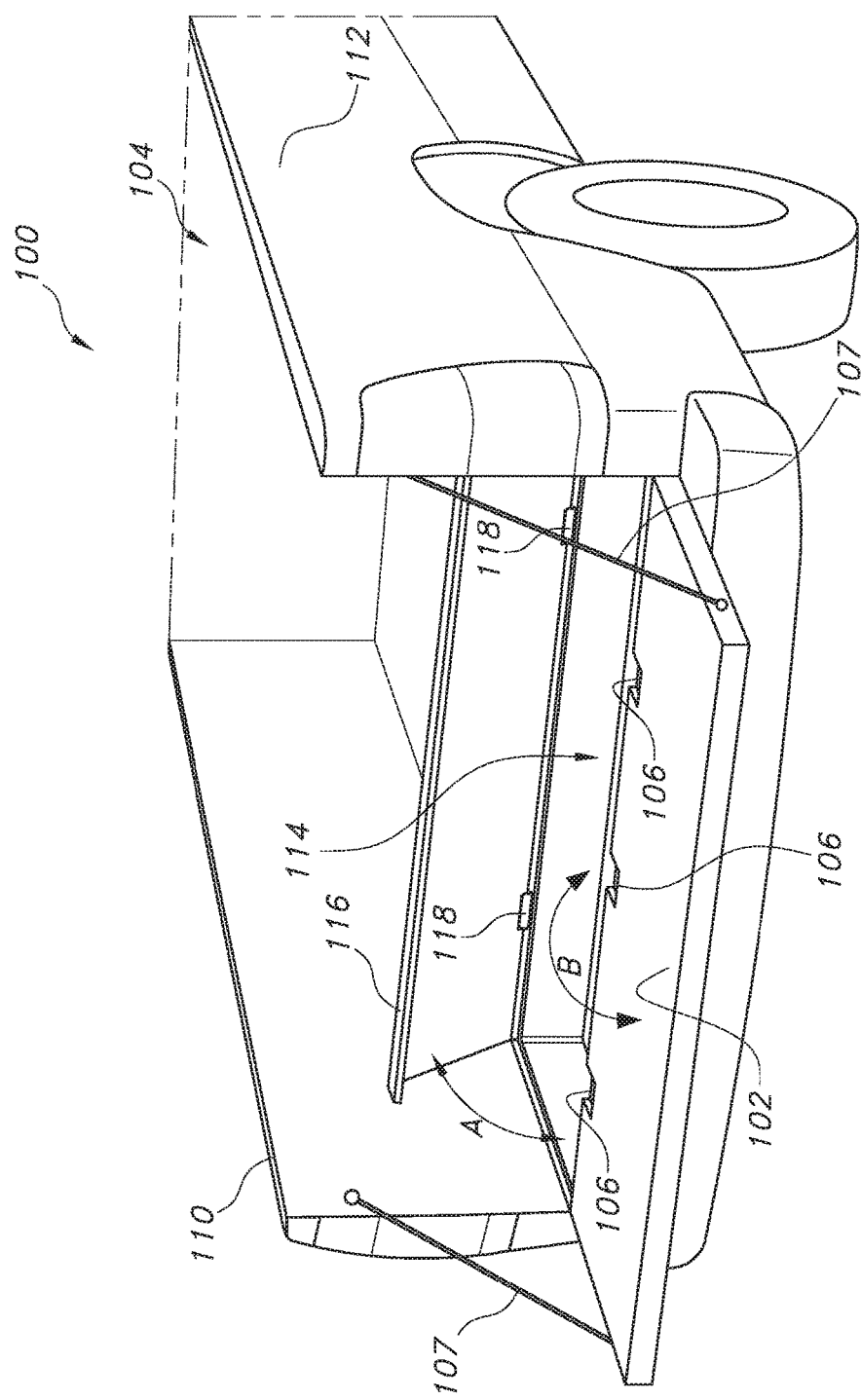
FIG. 1 shows a rear perspective view of a stowable cargo area closure according to the present disclosure, held in a deployed configuration.

FIG. 1 illustrates a vehicle 100 including an embodiment of a stowable cargo area closure 102 according to the present disclosure. As shown therein, the stowable cargo area closure 102 is a pivoting tailgate, attached to a rearmost portion of a cargo area 104 by a hinge arrangement 106. Optionally, stays 107 may be provided to restrict the range of pivoting motion of the cargo area closure 102. The cargo area 104 is defined by at least a load floor 108 (not visible in this view) and a pair of opposed sidewalls 110, 112.

A cargo area closure receiver 114 is provided in the cargo area 104, in the depicted embodiment being defined in a portion of the load floor 108. The cargo area closure receiver 114 may be defined in a bed liner (not shown) disposed on the load floor 108 or may be defined within or attached to the load floor itself. As will be appreciated, the cargo area closure receiver 114 is dimensioned and configured to receive the cargo area closure 102 therein. In embodiments, the cargo area closure receiver 114 may be a simple compartment dimensioned and configured to receive the cargo area closure 102 therein. Optionally, one or more friction or interference fit mechanisms or other fasteners (not shown) may be provided to ensure a snug fit that will not inadvertently allow the cargo area closure 102 to dislodge from the cargo area closure receiver 114.

In the depicted embodiment, a compartment cover 116 is provided, pivotally mounted to a portion of the load floor 108 by one or more hinges 118 to allow a pivoting motion between an open and a closed configuration (arrow A). In the depicted embodiment gooseneck hinges 118 are provided, although other hinge types are well known in the art and contemplated for use herein.

The hinge arrangement 106 may comprise a single hinge or a plurality of hinges, adapted to provide at least a 180 degree range of pivoting motion (arrow B) for the cargo area closure 102. As will be appreciated, this allows the cargo area closure 102 to be pivoted from an upright position vehicle-rearwardly to a deployed configuration as shown in the drawing and as is conventional for such closures.

Figure 2:
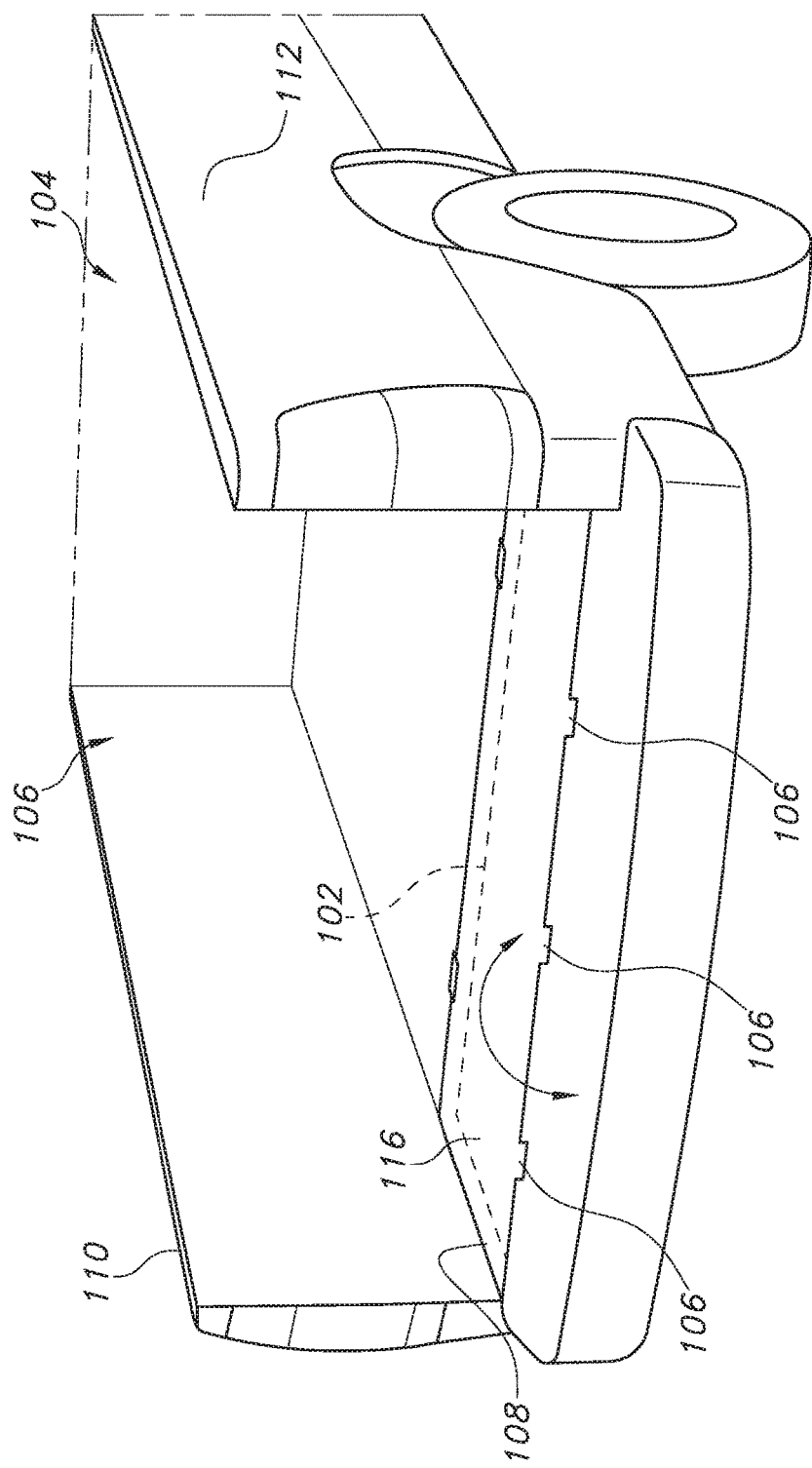
FIG. 2 shows the stowable cargo area closure of FIG. 1 in a stowed configuration.

The hinge arrangement 106 range of motion as describes also allows the cargo area closure 102 to be pivoted vehicle-forwardly to a stowed configuration (see FIG. 2) within the cargo area closure receiver 114. The cargo area closure 102 may then be hidden from view by pivoting the compartment cover 116 (arrow A) to the closed position as shown in the drawing. As will be appreciated, this adds an additional convenience of a substantially planar and uninterrupted load floor 108 for use as needed.

Figure 3:
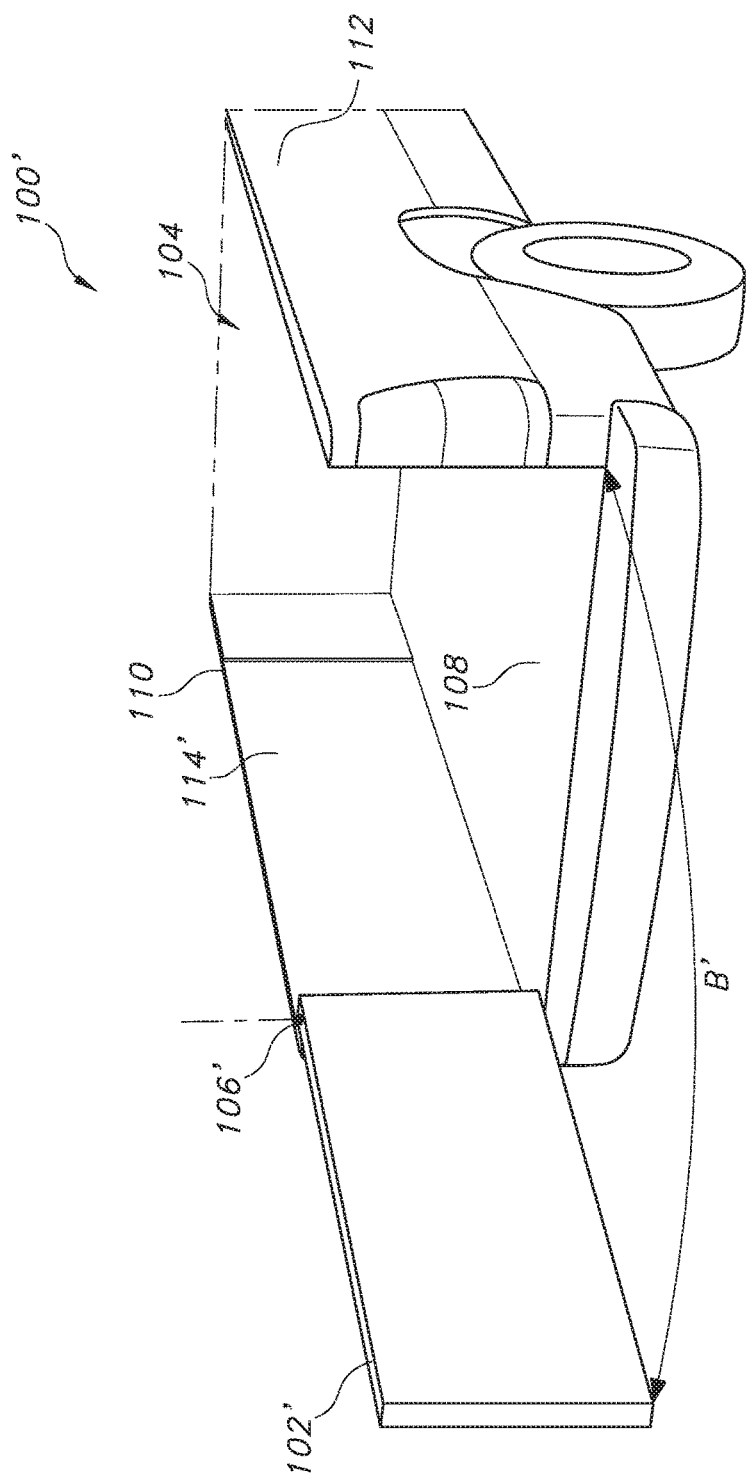
FIG. 3 shows a rear perspective view of an alternative embodiment of a stowable cargo area closure according to the present disclosure, held in a deployed configuration.

Alternative embodiments are contemplated. With reference to FIG. 3, a vehicle 100' is shown, including a cargo area closure 102' mounted adjacent a cargo area 104 by a hinge 106' arrangement. The hinge arrangement 106' is mounted to a vehicle-rearward edge of a one of the cargo area sidewalls 110, 112. A cargo area closure receiver 114' is provided in a corresponding cargo area sidewall 110, 112.

Again, the hinge arrangement 106' may comprise a single hinge or a plurality of hinges, adapted to provide at least a 180 degree range of pivoting motion (arrow B') for the cargo area closure 102'. This allows the cargo area closure 102' to be pivoted from an upright position vehicle-rearwardly to a deployed configuration as shown in FIG. 3.

Figure 4:
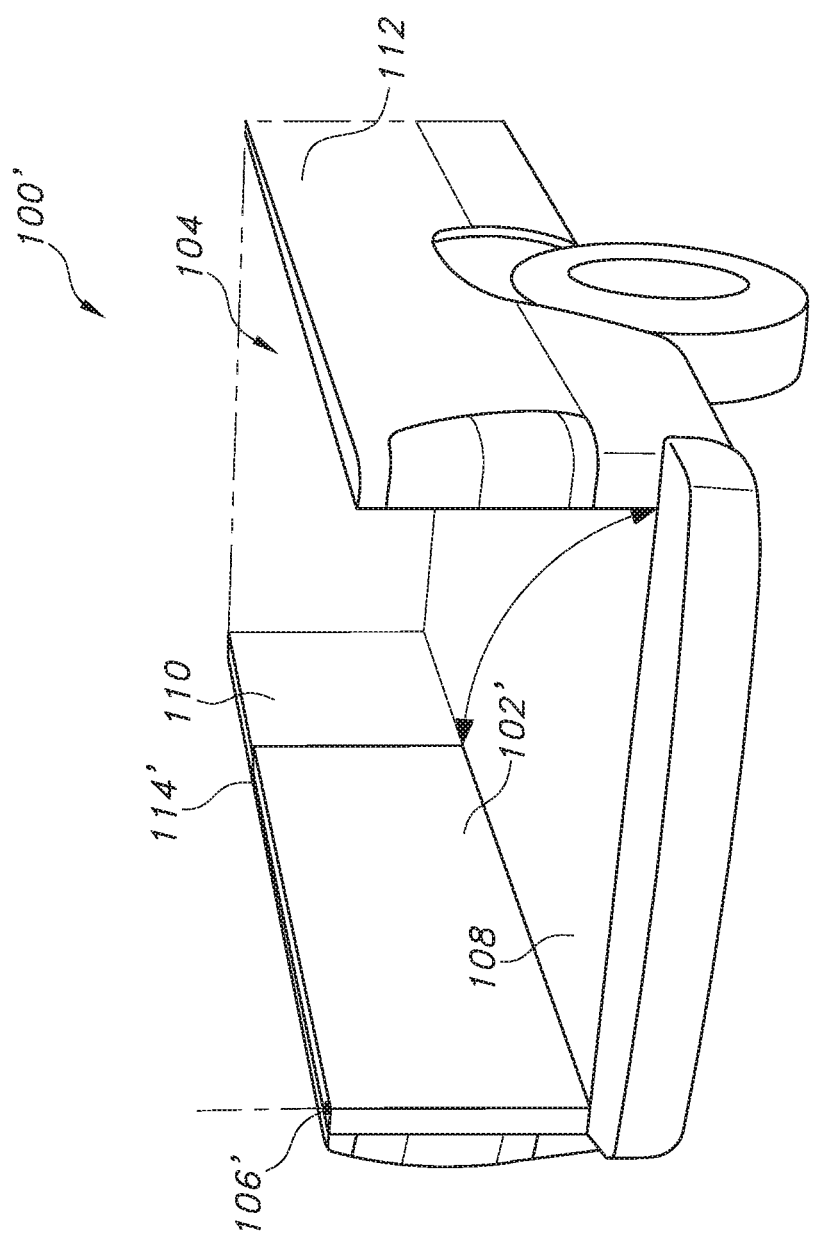
FIG. 4 shows the stowable cargo area closure of FIG. 3 in a stowed configuration.

The hinge arrangement 106' range of motion as describes also allows the cargo area closure 102' to be pivoted vehicle-forwardly to a stowed configuration (see FIG. 4) within the cargo area closure receiver 114'. In the depicted embodiment the cargo area closure receiver 114' is a simple compartment provided in or on a portion of a one of the cargo area sidewalls 110, 112 and dimensioned and configured to snugly receive the cargo area closure 102' therein. However, as described above it is contemplated to provide a compartment cover (not shown) hingedly attached to a portion of the one of the cargo area sidewalls 110, 112 whereby the cargo area closure 102' in the stowed configuration may then be hidden from view.

Still other embodiments are contemplated. For example, it is known to provide a cargo area closure such as a tailgate having a dual hinge, i.e. a hinge allowing the tailgate or other closure to be pivoted as desired either in the manner described in FIGS. 1 and 2 or in the manner described in FIGS. 3 and 4. One non-limiting but representative example of such a dual hinge arrangement is shown in U.S. Pat. No. 3,387,406 to Ford Motor Company, the entirety of the disclosure of which is incorporated herein by reference. Accordingly a vehicle including such a dual hinge arrangement providing at least a 180 degree range of motion to a cargo area closure 102, 102' as described above, and further including cargo area closure receivers 114, 114' as described above, is contemplated for versatility in the manner and position in which the cargo area closure 102, 102' may be stowed.

Figure 5A:
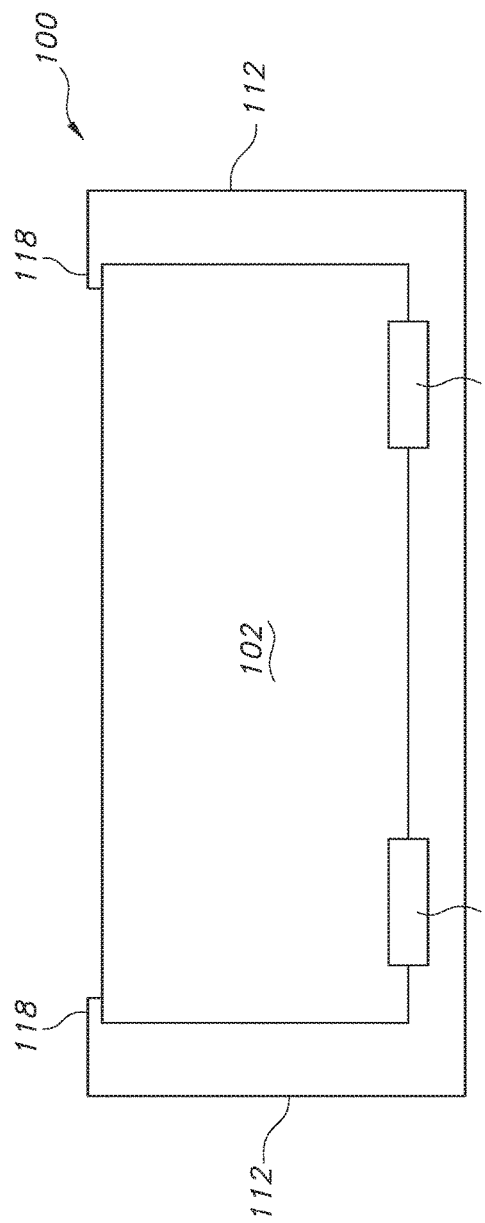
FIG. 5A illustrates a prior art cargo area closure in rear view.

A conventional tailgate 102 arrangement (see FIG. 5A) includes or defines a cargo area sidewall 112 flange 118 which prevents vehicle-forward pivoting. To allow pivoting the cargo area closures 102, 102' in a vehicle-forward direction in the manner described above and depicted in the drawing figures, it is contemplated to provide various mechanisms.

Figure 5B:
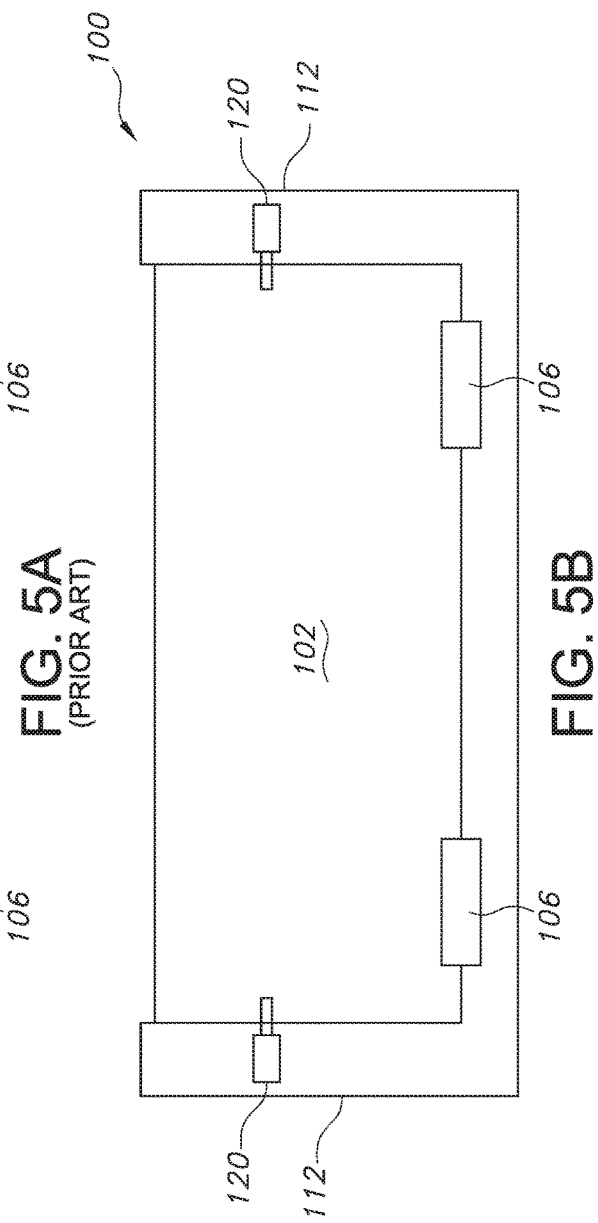
FIG. 5B shows an embodiment of a vehicle sidewall arrangement allowing vehicle-forward pivoting of a cargo area closure.

In one possible embodiment (see FIG. 5B), the cargo area sidewall may lack a flange 118. To retain the cargo area closure 102, 102' in an upright, closed position, a sidewall-mounted latch mechanism 120 is provided which may be manually or automatically operated to release the cargo area closure for vehicle-forward pivoting. Mechanisms for such manual or automated operation of latch mechanisms 120 are well-known in the art, and do not require extensive discussion herein.

In an alternative embodiment (see FIGS. 5C-5D), cargo area sidewalls 112 may be provided comprising flanges 118 attached thereto by hinges 122. To allow vehicle-forward pivoting of the cargo area closure 102, the hinged flanges 118 need only be pivoted sufficiently to provide clearance for the desired pivoting motion of the cargo area closure (see FIG. 5D).

As will be appreciated, by the foregoing structures a convenient and easily usable stowable cargo area closure is provided, allowing translation of a cargo area closure such as a tailgate between an upright position, a deployed position, and a stowed position. This all occurs without requiring removal of the cargo area closure. Further, in the stowed position the cargo area closure does not impact available usable space in the vehicle cargo area.

The foregoing has been presented for purposes of illustration and description. It is not intended to be exhaustive or to limit the embodiments to the precise form disclosed.

Obvious modifications and variations are possible in light of the above teachings. All such modifications and variations are within the scope of the appended claims when interpreted in accordance with the breadth to which they are fairly, legally and equitably entitled.

What is claimed:

1. A closure assembly for a vehicle, comprising a closure hingedly connected to a vehicle-rearmost portion of a cargo area and adapted to pivot vehicle-forwardly into a receiver provided in a sidewall of the cargo area.

2. The cargo area and closure assembly of claim 1, including a hinge arrangement adapted to pivot the closure both vehicle-rearwardly and vehicle-forwardly.

3. The cargo area and closure assembly of claim 2, wherein the hinge arrangement is at least one bottom hinge attaching a closure bottom edge to a portion of the cargo area load floor.

4. The cargo area and closure assembly of claim 2, wherein the hinge arrangement is at least one side hinge attaching a closure side edge to a portion of the cargo area sidewall.

5. The cargo area and closure assembly of claim 1, wherein the closure is a tailgate.

6. A vehicle including the cargo area and closure assembly of claim 1.

7. A cargo area assembly for a vehicle, comprising:
   at least a load floor and a pair of opposed sidewalls;
   a receiver provided in at least one of the load floor and one of the pair of opposed sidewalls;
   a closure hingedly connected to a vehicle-rearmost portion of the cargo area and adapted to pivot to a stowed position within the receiver; and
   a compartment cover adapted to overlie the closure when in the stowed position.

8. The cargo area assembly of claim 7, wherein the closure is a tailgate.

9. The cargo area assembly of claim 8, wherein the receiver is a compartment provided in a portion of the load floor.

10. The cargo area assembly of claim 8, wherein the receiver is a compartment provided in a portion of the one of the pair of opposed sidewalls.

11. The cargo area assembly of claim 9, wherein the tailgate includes a bottom hinge adapted to pivot the tailgate both vehicle-rearwardly and vehicle-forwardly.

12. The cargo area assembly of claim 11, wherein the bottom hinge attaches a tailgate bottom edge to a portion of the load floor.

13. The cargo area assembly of claim 10, wherein the tailgate includes a side hinge adapted to pivot the tailgate both vehicle-rearwardly and vehicle-forwardly.

14. The cargo area assembly of claim 13, wherein the side hinge attaches a tailgate side edge to a portion of the one of the pair of opposed sidewalls.

15. A vehicle including the cargo area assembly of claim 7.

16. A vehicle, comprising:
   a body including a cargo area comprising at least a load floor, a pair of opposed sidewalls, and a cargo area closure;
   a cargo area closure receiver provided in at least one of the load floor or one of the pair of opposed sidewalls, the cargo area closure being adapted to pivot vehicle-forwardly into the cargo area closure receiver; and
   a compartment cover adapted to overlie the cargo area closure when in the stowed position.

17. The vehicle of claim 16, wherein the cargo area closure receiver is a compartment provided in the load floor.

18. The vehicle of claim 16, wherein the cargo area closure receiver is compartment provided in the one of the pair of opposed sidewalls.

* * * * *